United States Patent [19]

Fevre et al.

[11] Patent Number: 5,178,411
[45] Date of Patent: Jan. 12, 1993

[54] DEVICE FOR ADJUSTING THE POSITION OF AN ADJUSTABLE STEERING COLUMN

[75] Inventors: Laurent Fevre, Connere; Bernard Haldric; Jacques Foulquier, both of Vendome, all of France

[73] Assignee: NACAM, Vendome, France

[21] Appl. No.: 709,993

[22] Filed: Jun. 4, 1991

[30] Foreign Application Priority Data

Jun. 7, 1990 [FR] France .................. 90 07091

[51] Int. Cl.⁵ .............................................. B62D 1/18
[52] U.S. Cl. ....................................... 280/775; 74/493; 74/89.15
[58] Field of Search .................. 280/775; 74/493, 89.15

[56] References Cited

U.S. PATENT DOCUMENTS

| | | | |
|---|---|---|---|
| 4,785,684 | 11/1988 | Nishikawa et al. | 280/775 |
| 4,796,481 | 1/1989 | Nolte | 280/775 |
| 4,893,518 | 1/1990 | Matsumoto et al. | 280/775 |
| 4,900,059 | 2/1990 | Kinoshita et al. | 280/775 |

FOREIGN PATENT DOCUMENTS 315823 5/1989 European Pat. Off.
3732817 4/1988 Fed. Rep. of Germany.

OTHER PUBLICATIONS

Patent Abstracts of Japan, vol. 10, No. 191 (M-495)[2247], Jul. 4, 1986; & JP-A-61 36 056 (Mazda Motor Corp.) Feb. 20, 1986.

Primary Examiner—Kenneth R. Rice
Attorney, Agent, or Firm—Wenderoth, Lind & Ponack

[57] ABSTRACT

A device comprises a single motor (30) and a transmission (40) associated with the motor (30) and with a sleeve (22) and which has an input (410) connected to the motor (30) and two outputs (421, 422) which are associated with a movable body (222). One of these outputs (421) is connected to a sliding element (2221) in order to cause it to move translationally, and the other of these outputs (422) is connected to a pivoting element (2222) in order to cause it to be inclined. The two outputs (421, 422) are activated at paired relative speeds in order to ensure the adjustment in terms of depth of the two elements (2221, 2222) of the movable body (222), and of sections (211, 212) of a shaft (21) which these elements carry, and so that only the output (422) connected to the pivoting element (2222) is activated in order to ensure adjustment in terms of inclination of the pivoting element (2222) and of the shaft section (211) which it carries. A control is connected to the motor (30) and to the transmission (40) in order to operate them for the translational movement in both opposite directions, permitting adjustment in terms of depth, or for pivoting in both opposite directions, permitting adjustment in terms of inclination.

20 Claims, 3 Drawing Sheets

DEVICE FOR ADJUSTING THE POSITION OF AN ADJUSTABLE STEERING COLUMN

BACKGROUND OF THE INVENTION

1. Field of the Invention

The present invention relates to motor vehicles, and especially their steering columns, and its subject is more particularly a motorized device for controlling and adjusting the position of an adjustable steering column.

2. Description of the Prior Art

The current trend in the automotive industry is not only toward improving the technical performance of vehicles, but also toward improving the comfort of the occupants and especially that of the driver so as to be able to adapt, at least partially and locally, the geometry of the passenger compartment to the shape of a passenger, and in particular of the driver. This is particularly so for the steering wheel which terminates the steering column. The position of the steering wheel, in terms of depth and inclination, can be selected and fixed as a function of the state of the seats of the vehicle and as a function of the shape of the driver and of his style of driving.

Motor vehicles which are equipped with steering columns which can be adjusted in terms of depth and/or inclination are in some cases currently motorized, making use of separate electric motors for the control and the adjustment of the depth and for the control and the adjustment of the inclination. These special motors for the two degrees of freedom, which are usually movable, are also associated with special transmissions for each degree of freedom.

It can easily be seen that the use of two motors and two transmissions increases costs both because of the supplying of the components and because of their assembly and their fitting. In addition to this economical aspect, there should also be mentioned the constraints which result from the maintenance and the overhauling or repair involved with the existence of relatively numerous and complex components, the presence of which only increases the risks of failure.

SUMMARY OF THE INVENTION

The object of the invention is to overcome most of the disadvantages of the current solutions with the aid of a device which employs a single motor and a special transmission, and which makes it possible to control and to adjust one or the other of the displacements in terms of depth and inclination of an adjustable steering column for motor vehicles.

The subject of the invention is a motorized device for controlling and adjusting the position of a steering column which can be adjusted in terms of depth and inclination for motor vehicles. The column comprises a shaft formed from an end section intended to carry a steering wheel, an extendable or retractable interposed section consisting of two parts assembled by a sliding joint, linking universal joints joining these sections together, a sleeve formed from a fixed body connected to the vehicle, a movable body consisting of an element which slides relative to the fixed body and of an element which pivots relative to the sliding element by means of an articulation about an axis orthogonal to that of the column, and bearings supporting the shaft in the sleeve. The device is notable in that it comprises a single motor, a transmission which is associated with the motor and with the sleeve and which has an input connected to the motor, and two outputs which are associated with the sleeve in such a way that one of these outputs causes translational movement and the other of these outputs causes inclination. The two outputs are activated at paired relative speeds in order to ensure the adjustment in terms of depth of the two elements of the movable body, and of the sections of the shaft which these elements carry, and so that only one of the outputs is activated in order to ensure the adjustment in terms of inclination of the pivoting element and of the shaft section which it carries. A control means is connected to the motor and to the transmission in order to operate them in both directions separately for the depth or the inclination, or in order to stop them.

BRIEF DESCRIPTION OF THE DRAWINGS

Other features of the invention will become apparent upon reading the description and the claims which follow, and upon examination of the attached drawing, which is given purely by way of example, and in which:

DESCRIPTION OF THE PREFERRED EMBODIMENTS

Figures 1, 2:
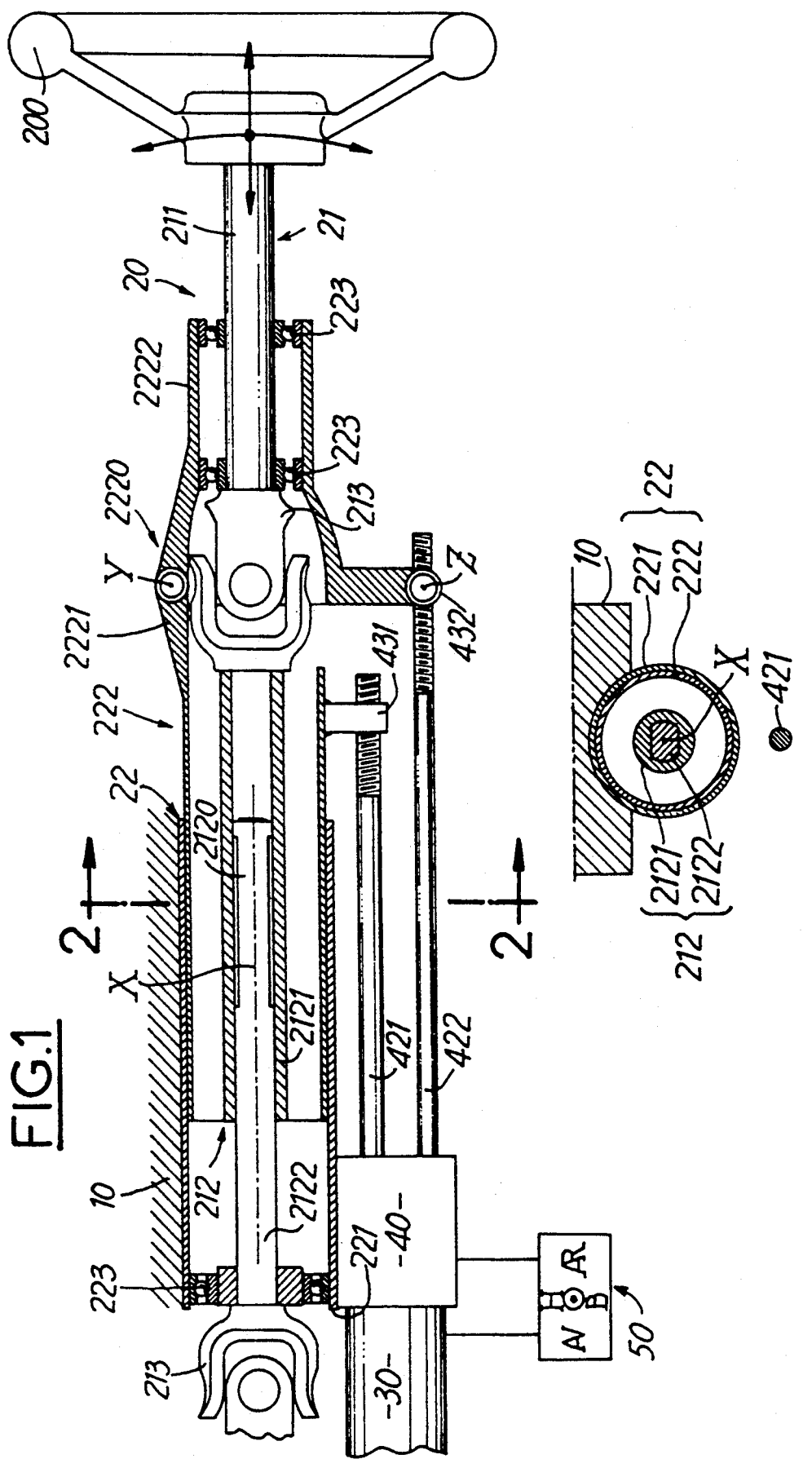
FIG. 1 is a partial, longitudinal cross-section of an embodiment of a device according to the invention.
FIG. 2 is a cross-section along a plane 2—2 in FIG. 1.

Since motor vehicle steering columns which can be adjusted in terms of depth and/or inclination are well known in the prior art, only that which relates directly or indirectly to the invention will be described below. For the remainder, the person skilled in the art in question will draw from the current conventional solutions available to him in order to deal with the particular problems with which he is faced.

In what follows, the same reference numeral will always be used to identify an identical element, irrespective of the particular embodiment in question.

For the sake of convenience, in the explanation each of the components of the device according to the invention will be described successively before explaining how they operate.

The motorized device for controlling and adjusting the position of a steering column which can be adjusted in terms of depth and inclination for motor vehicles according to the invention is intended to be mounted directly or indirectly on a structure 10 of a vehicle equipped with a steering column 20 which can be adjusted in terms of depth and inclination. This device comprises a single motor 30, a transmission 40 driven by the motor 30, and a control means 50 connected to the motor 30 and to the transmission 40.

The steering column 20, of any current conventional type, has an axis X and comprises a shaft 21 formed from an end section 211 intended to carry a steering wheel 200 from and from an interposed section 212. This interposed section 212 is formed from two parts 2121 and 2122 which are joined to each other by a joint 2120 which enables these two parts to slide parallel to the axis X, relative to each other, while at the same time being integral in terms of rotation. This joint is, for example, obtained by complementary profiles with a noncircular cross-section, or by splines. These sections 211 and 212 are connected to each other by linking universal joints 213.

The shaft 21 is housed in a sleeve 22 which comprises a fixed body 221 and a movable body 222. The fixed body 221 is fixed to the structure 10 by any appropriate conventional technique, for example welding or screwing. As can be observed, the movable body 222 is formed from an element 2221 which slides with respect to the fixed body 221, and from an element 2222 which pivots relative to the sliding element 2221. The elements 2221 and 2222 are connected to each other via an articulation 2220 which has an axis Y orthogonal to the axis X of the column. This articulation 220 is preferably situated straight above the universal joint 213 linking the sections 211 and 212, as is clearly illustrated. Bearings 223 support the shaft 21 in its sleeve 22.

Such a steering column, and the details of its structure, the mounting and the assembly of which are clearly apparent upon examination of FIG. 1, permits adjustment in terms of depth and inclination, and does so in both opposite directions of the steering wheel, as is indicated diagrammatically by the double arrows. The adjustment in terms of depth in both directions results from the relative sliding of the parts 2121 and 2122 of the section 212 along the axis X. The adjustment in terms of inclination in both directions results from the relative pivoting of the elements 2221 and 2222 of the body 222 with respect to the axis Y, which is orthogonal to the axis X. It will be observed that, in order to permit a pivoting of the steering wheel with respect to the axis Y of the articulation 2220, it is necessary for one of the bearings 223, and especially the bearing which is located in proximity to the universal joint situated on the left in FIG. 1, i.e. placed at the end of the interposed section 212 opposite the section 211, to be of the spherical type, for example a so-called spherical rolling bearing.

The single motor 30, which is preferably an electric motor, is mounted on the sleeve 22, for example and preferably on its fixed body 221, either directly or via the transmission 40 as illustrated.

Figure 3:
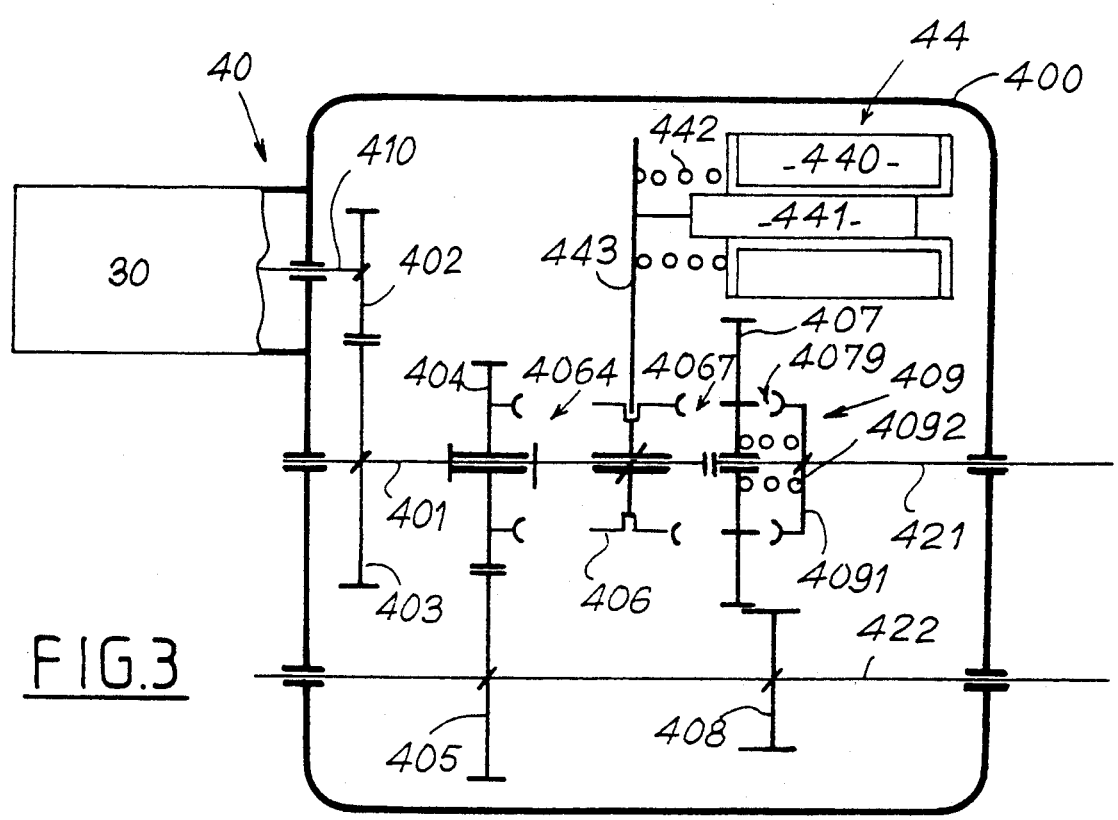
FIG. 3 is a diagrammatic detailed view of an embodiment of the transmission of the device according to the invention.
Figure 4:
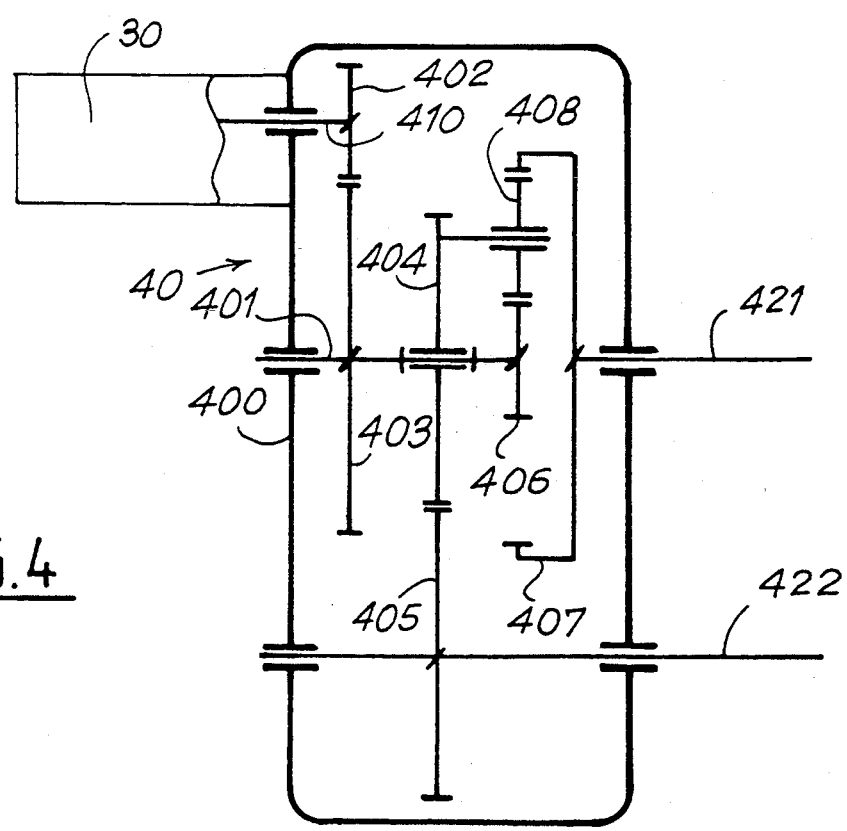
FIG. 4 is a diagrammatic detailed view of another embodiment of the transmission of the device according to the invention.

The transmission 40 of the device according to the invention, various embodiments of which are shown diagrammatically in detail in FIGS. 3 and 4, is interposed between the motor 30 and the sleeve 22. This transmission comprises an input 410 which is connected to the motor 30, and two outputs 421 and 422 which are associated with the movable body 222. The outputs are preferably mounted in such a way that the output 421 is connected to the sliding element 2221 and the output 422 is connected to the pivoting element 2222. These connections are ensured by means of joints 431 and 432 of the bolt/nut type, in which the nut is carried by the elements 2221 and 2222, as illustrated. It will be observed, especially by examining FIG. 1, that the joint 432 which connects the output 422 to the pivoting element 2222 is situated opposite the articulation 2220 with respect to the axis X, and can move along an axis Z which is parallel to the axis Y of the articulation 2220. It will also be observed that the axis Y preferably does not converge to the center of rotation of the universal joint 213 which links the sections 211 and 212.

The embodiment of the transmission which is illustrated in FIG. 3 is of the pinion and sliding-gearwheel gearbox type which is operated by a preferably electro-mechanical actuator 44. As can be observed, this transmission 40 is housed in a casing 400 which comprises a shaft 401, parallel to the input 410, which is preferably coaxial with the output 421 and parallel to the output 422. The shaft 401, the input 410 and the outputs 421 and 422 are mounted in any appropriate conventional manner in the casing 400 so as to be able to rotate therein. As can be observed, the input 410 carries a fixed pinion 402 which is keyed and driven in rotation. The shaft 401 carries pinions 403 and 404 and a sliding gearwheel 406. The pinion 403 is fixed and keyed on the shaft 401 and meshes with the pinion 402. The pinion 404 is mounted so as to be idle in rotation on the shaft 401 but is immobilized axially on the shaft 401 so as to be unable to slide. The sliding gearwheel 406 is mounted on the shaft 401 so as to be able to slide on the latter axially, whilst at the same time being keyed so as to be driven in rotation. Such a mounting of the sliding gearwheel 406 on the shaft 401 is obtained in any current conventional manner, for example with the aid of splines. The output 421, which is coaxial with the shaft 401 but separate from it, carries a pinion 407 which is simultaneously idle on the output 421 and mounted so as to be able to move axially on the output 421. The output 421 also carries a coupling or clutch 409, which comprises a bell 4091 which is integral in rotation with the output, 421 and of a spring 4092 which is interposed between the bell and the pinion 407, as illustrated, in such a way as normally to tend to move the pinion and the bell apart. The output 422 carries two pinions 405 and 408 which are fixed axially and are keyed in rotation on the output. The pinion 405 meshes with the pinion 404, and the pinion 408 meshes permanently with the pinion 407, the pinion 407 being idle and capable of axial movement.

Claws 4064, 4067 and 4079, of any current conventional type, are arranged as illustrated. The claw 4064 makes it possible to bring into engagement, as desired, the pinion 404 and the sliding gearwheel 406 so that they will rotate together. The claw 4067 makes it possible to bring into engagement, as desired, the sliding gearwheel 406 and the pinion 407 so that they rotate together. The claw 4079 makes it possible, as desired, to make the pinion 407 integral in rotation with the bell 4091 of the coupling or clutch 409. The actuator 44 comprises, for example, an electromagnet 440. A plunger 441 is connected, after interposition of a spring 442, to a rod 443 which terminates, for example, in a fork or similar element engaged in a groove or the like of the sliding gearwheel 406 so as to control the axial sliding thereof.

In this embodiment, the electromagnet is of the "normally open contact" type. Consequently, when the electromagnet 440 is not excited, the spring 442 normally pushes back the sliding gearwheel 406 toward the pinion 404 so as to engage with the claw 4064. In such a situation, it can be seen that if the input rotates in one or other direction, it drives the pinion 402, in one or other direction, which in turn moves the pinion 403, which drives the shaft 401 and the sliding gearwheel 406 which is keyed thereon and which is in engagement with the pinion 404 meshing with the pinion 405 keyed on the output 422. The output 422 rotates alone while the output 421 remains fixed, since the pinion 408 keyed on the output 422 meshes with the pinion 407 which is idle on the output 421 since the claw 4079 is not engaged. If, on the contrary, the electromagnet 440 is excited, the plunger 441 is attracted and the spring 442 is compressed. In such a situation, the sliding gearwheel 406 is pushed toward the pinion 407, which is itself then pushed toward the bell 4091 against the spring 4092, which is then compressed. It can be seen that the claws 4067 and 4079 are engaged and then respectively make integral in rotation, on the one hand, the keyed sliding gearwheel 406 and the idle pinion 407 and, on the other hand, the idle pinion 407 and the keyed bell 4091. In such a situation, it can then be seen that if the input rotates in one or other direction, the two outputs 421 and 422 are simultaneously driven via the sliding gearwheel 406 and the pinion 407 which are in mutual engagement, and also by the pinion 407 which is simultaneously coupled to the bell 4091 keyed on the output 421 and meshing with the pinion 408 keyed on the output 422.

In FIG. 4, a transmission has been shown which is in the form of an epicyclic train. In such a case, the actuator 44 (not shown) acts on one of the pinions of the train. It can be seen that, depending on whether the actuator brakes or locks the pinion in question, the output 421 is driven or is not driven, whereas the output 422 is for its part driven at all times.

In particular, it can be seen that if the actuator immobilizes the planet gear 408 with respect to the pinion 406, all the pinions 403, 404, 407 and 408 rotate as a unit. The two outputs 421 and 422 are activated, and the adjustment in terms of depth is ensured. If the actuator now immobilizes the pinion 407 with respect to the casing 400, it can be seen that only the output 422 is activated, and the adjustment in terms of inclination is then ensured. It will be observed that in both situations the output 422 is always activated via the pinions 404 and 405.

The operation of the device according to the invention is ensured by a control means 50 which enables the motor 30 and the actuator 44 to be operated. This control means is, for example, of the joystick type which is used, for example, for the electrical control of the orientation of the outside rear-view mirrors of motor vehicles. This control means, preferably of the five-position switch type, comprises an inactive or neutral position in which the device is stopped, and four active positions. Two of the active positions correspond to the control and the adjustment in terms of depth in both opposite directions, one for each direction, and the other two active positions correspond to the control and the adjustment in terms of inclination in both opposite directions, one for each direction. This control means is designed in such a way that it enables, if appropriate, the displacement to take place at a speed which is or is not constant.

It is clear that this control means 50 may also, for example, be in the form of two separate switches of the reversing switch with a central neutral position type, if necessary with automatic return. In such a case, one switch is used for controlling the depth and the other for controlling the inclination.

Reference will now be made to FIG. 1. It can be seen that if the output 421 is not activated and that if only the output 422 is operative, the joint 432 is displaced in one or other of the two opposite directions, causing the element 2222 to pivot about the articulation 2220, the axis Y of which is perpendicular to the plane of the figure. This makes it possible to modify the inclination of the steering wheel upwards or downwards. Indeed, in this case, the element 2221 remains fixed and only the element 2222 pivots.

If now it is arranged for the outputs 421 and 422 to be driven simultaneously so as to displace simultaneously, in the same direction and at the same speed, the joints 431 and 432, the elements 2221 and 2222 remain stationary relative to each other, whilst at the same time sliding together as a unit with respect to the fixed body 221. In such a case, the depth of the steering wheel is adjusted by moving it toward or away from the driver, without modifying its inclination.

Assuming that:
* L is the distance which separates the axes Y and Z,
* $P_t$ is the pitch of the bolt/nut joint 431,
* $P_r$ is the pitch of the bolt/nut joint 432,
* $\omega$ (omega) is the relative angular velocity of the element 2222 with respect to the element 2221,
* $V_t$ is the translational speed of the element 2221 with respect to the body 221 or to the structure 10, and
* $V_r$ is the translational speed of the joint 432 with respect to the body 221 or to the structure 10, then
  $V_r = L \times \omega$ (omega).

For a displacement of the steering wheel in terms of inclination, in one or other direction, the output 421 is held stationary and the output 422 is rotated at the angular velocity $\omega_{r1}$ (omega$_{r1}$). The latter is selected so that $$\omega_{r1} = \frac{V_r}{P_r} = \frac{L\omega}{P_r}$$

In order to obtain a displacement of the steering wheel in terms of depth, in one or other direction, the same procedure as above is followed so that $V_t$ is equal to $V_r$. If the output 421 rotates at a velocity $\omega_t$ (omega$_t$) selected so that $$\omega_t = V_t/P_t,$$

then the output 422 is rotated at the angular velocity $\omega_{r2}$ (omega$_{r2}$), which requires omega$_{r2}$ to be selected so that $$\omega_{r2} = V_r/P_r = V_t/P_r = P_t/P_r \times \omega_t.$$

The number of teeth of the various pinions is selected so as to obtain the angular velocities $\omega_t$ (omega$_t$), $\omega_{r1}$ (omega$_{r1}$) and $\omega_{r2}$ (omega$_{r2}$) as determined above.

In the embodiment illustrated in FIG. 1, the motor 30 and the transmission 40, integrally connected to the structure 10 via the fixed body 221 of the sleeve 22, are fixed. Such a solution offers numerous and very appreciable advantages. Firstly, there is a considerable reduction in the overall size resulting from the use of a single motor which, by virtue of its immobility, does not "sweep" an appreciable volume during operation. Secondly, there is a reduction in mass resulting from the use of a single motor which permits a substantial improvement in the dynamic behavior of the device when subjected to vibrations.

However, it should be noted that this mounting is not the only possible kind.

Figure 5:
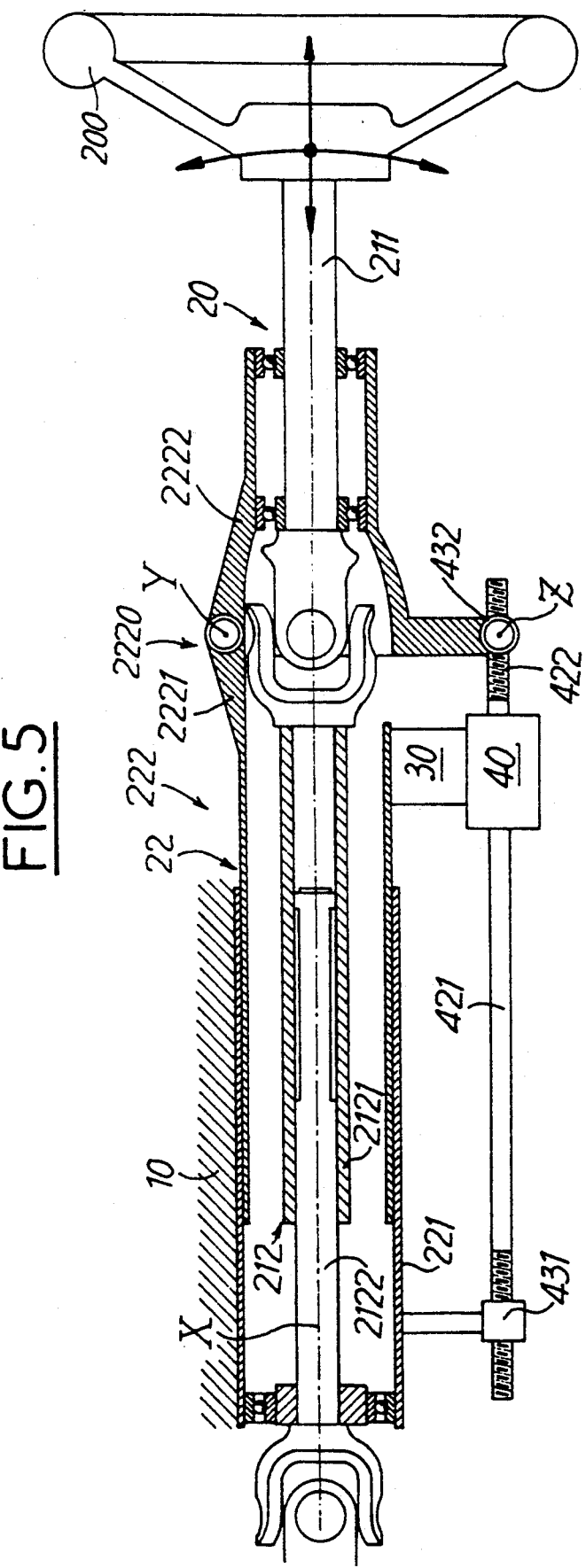
FIG. 5 is a view similar to that in FIG. 1 of another embodiment.

Indeed, the motor 30 and the transmission 40 can be made integral with the sliding element 2221. In such a case, the outputs 421 and 422 are no longer side by side but situated on either side of the transmission, and the nut of the joint 431 is then carried by the fixed body 221, and the other by the pivoting element 2222. This is shown in detail in FIG. 5.

It can also be arranged for the motor 30 and the transmission 40 to be made integral with the pivoting element 2222. In such a case, the outputs 421 and 422 are still side by side, and the joining nuts 431 and 432 are then carried by the fixed body 221 and by the sliding element 2221 respectively.

The advantage of the device according to the invention can therefore be understood in its entirety, which device makes it possible to obtain the adjustment of a steering column with two degrees of freedom, in terms of inclination and depth, and does so in both directions with a single motor and with the aid of a single control means acting on the motor and the transmission.

What is claimed is:

1. An arrangement for controlling and adjusting the depth and inclination of a steering wheel for a motor a vehicle, comprising:
    a steering column having an axis and comprising a shaft, said shaft including an end section for carrying a steering wheel, an extendable and retractable section, and a universal joint joining said end section and said extendable and retractable section, said extendable and retractable section being composed of two parts connected to each other by a sliding joint for relative sliding movement therebetween;
    a sleeve having a fixed sleeve body fixed relative to the motor vehicle and a movable body sliding in said fixed sleeve body, said movable body comprising a sliding element slidable in and relative to said fixed sleeve body and a pivoting element pivotable relative to said sliding element about an articulation axis spaced from but orthogonal to said axis of said steering column;
    bearings supporting said shaft in said sleeve;
    a single motor; transmission means for transmitting rotation from an input of said transmission means connected to said single motor to first and second outputs of said transmission means connected with said sleeve such that one of said outputs causes sliding movement of said sliding element and the other of said outputs causes pivoting movement of said pivoting element, said outputs being activated by said transmission means at paired relative speeds to adjust the depth of said sliding element and said pivotable element and said end section of said shaft, and only one said output being activated by said transmission means to adjust the inclination of said pivoting element relative to said sliding element and said end section of said shaft relative to said extendable and retractable section; and
    a control means connected to said motor and to said transmission means for operating said motor and said transmission means to adjust the depth of said sliding element and said pivotable element and thus said end section in opposite axial directions and to adjust the inclination of said pivoting element relative to said sliding element and thus said end section relative to said extendable and retractable section in opposite angular directions.

2. The arrangement of claim 1, wherein each said output has a bolt portion engaging a nut carried by said sleeve.

3. The arrangement of claim 1, wherein said motor and said transmission means are fixed and carried by said fixed sleeve body, one of said outputs is connected to said sliding element for sliding movement thereof and the other of said outputs is connected to said pivoting element for pivotal movement thereof.

4. The arrangement of claim 1, wherein said motor and said transmission means are carried by said movable body.

5. The arrangement of claim 4, wherein said motor and said transmission means are carried by said sliding element, one said output being connected to said fixed sleeve body and the other of said outputs being connected to said pivoting element.

6. The arrangement of claim 1, wherein said motor and said transmission means are carried by said pivoting element, one said output being connected to said fixed sleeve body and the other of said outputs being connected to said sliding element.

7. The arrangement of claim 2, wherein said pivoting element carries one of said nuts opposite to said articulation axis relative to said axis of said steering column, said nut and said bolt portion of said output defining a joint movable along an axis parallel to said articulation axis.

8. The arrangement of claim 1, wherein said transmission means is a pinion and sliding-gearwheel gearbox transmission.

9. The arrangement of claim 1, wherein said transmission means is an epicyclic train transmission.

10. The arrangement of claim 1, wherein said transmission means includes an electromechanical actuator for alternating between activation of said output at paired relative speeds and only one said output being activated.

11. An arrangement for controlling and adjusting the depth and inclination of a steering wheel for a motor a vehicle, comprising:
    a steering column having an axis and comprising a shaft, said shaft including an end section for carrying a steering wheel, an extendable and retractable section, and a universal joint joining said end section and said extendable and retractable section, said extendable and retractable section being composed of two parts connected to each other by a sliding joint for relative sliding movement therebetween;
    a sleeve having a fixed sleeve body fixed relative to the motor vehicle and a movable body sliding in said fixed sleeve body, said movable body comprising a sliding element slidable in and relative to said fixed sleeve body and a pivoting element pivotable relative to said sliding element about an articulation axis spaced from but orthogonal to said axis of said steering column;
    bearings supporting said shaft in said sleeve;
    a single motor;
    a transmission having an input connected to said motor and two outputs, said transmission being mounted together with said motor with one of a fixed location, said sliding element and said pivoting element, one of said outputs being operably connected with another of said fixed location, said sliding element and said pivoting element, and the other of said outputs being operably connected with the third of said fixed location, said sliding element and said pivoting element, such that operation of said motor and said transmission can alternatively axially slide said sliding element and said pivoting element together for axial reciprocable adjustment of said end section of said steering column or pivot said pivoting element relative to said sliding element for angular adjustment of said end section; and a control means connected to said motor and said transmission for operation thereof to adjust the depth of said sliding element and said pivotable element and thus said end section in opposite axial directions and to adjust the inclination of said pivoting element relative to said sliding element and thus said end section relative to said extendable and retractable section in opposite angular directions.

12. The arrangement of claim 11, wherein each said output has a bolt portion engaging a nut carried by said sleeve.

13. The arrangement of claim 11, wherein said motor and said transmission are fixed and carried by said fixed sleeve body, one of said outputs is connected to said sliding element for sliding movement thereof and the other of said outputs is connected to said pivoting element for pivotal movement thereof.

14. The arrangement of claim 11, wherein said motor and said transmission are carried by said movable body.

15. The arrangement of claim 14, wherein said motor and said transmission are carried by said sliding element, one said output being connected to said fixed sleeve body and the other of said outputs being connected to said pivoting element.

16. The arrangement of claim 14, wherein said motor and said transmission are carried by said pivoting element, one said output being connected to said fixed sleeve body and the other of said outputs being connected to said sliding element.

17. The arrangement of claim 12, wherein said pivoting element carries one of said nuts opposite to said articulation axis relative to said axis of said steering column, said nut and said bolt portion of said output defining a joint movable along an axis parallel to said articulation axis.

18. The arrangement of claim 11, wherein said transmission is a pinion and sliding-gearwheel gearbox transmission.

19. The arrangement of claim 11, wherein said transmission is an epicyclic train transmission.

20. The arrangement of claim 11, wherein said transmission includes an electromechanical actuator for alternating between activation of said output at paired relative speeds and only one said output being activated.

* * * * *